C. L. MILLER.
DRIVING AXLE FOR TRACTORS.
APPLICATION FILED AUG. 30, 1917.

1,322,325.

Patented Nov. 18, 1919.

Inventor
Charles L. Miller
By J. M. St. John
Atty

UNITED STATES PATENT OFFICE.

CHARLES L. MILLER, OF CEDAR RAPIDS, IOWA.

DRIVING-AXLE FOR TRACTORS.

1,322,325.   Specification of Letters Patent.   Patented Nov. 18, 1919.

Application filed August 30, 1917. Serial No. 188,919.

*To all whom it may concern:*

Be it known that I, CHARLES L. MILLER, a citizen of the United States, residing at Cedar Rapids, in the county of Linn and State of Iowa, have invented certain new and useful Improvements in Driving-Axles for Tractors; and I do hereby declare the following to be a full, clear, and exact description of the invention, such as will enable others skilled in the art to which it appertains to make and use the same.

This invention relates to tractors of the kind employed for heavy draft purposes, and more particularly to the mounting of the tractor frame on the rear axle and the transmission of driving power to the rear wheels.

The invention consists in a novel construction whereby great rigidity in the rear axle and the main frame may be secured, with perfect freedom of movement in the driving and operating mechanism. The invention also secures by simple means the possibility of assembling and disassembling the rear axle parts without disturbing the bearing parts of the main frame, which are formed integrally with the frame, and admit the revolving parts endwise. The construction is such as to provide an inclosed, dust-protected drive-gear, a full "floating axle" strongly reinforced against deflection, and a powerful, but easily detachable connection of the driving parts with the traction wheels.

The specific nature of the invention will fully appear in the description and claims following, reference being had to the accompanying drawing, in which:—

Figure 1:
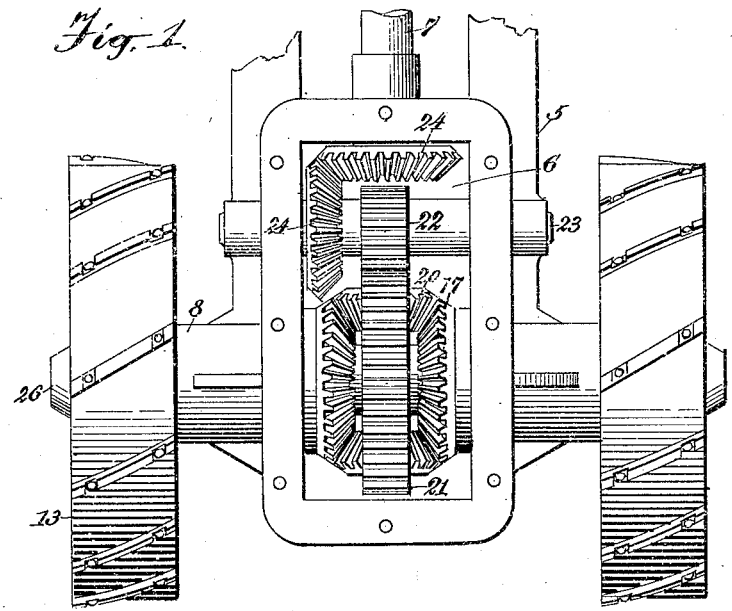
Figure 2:
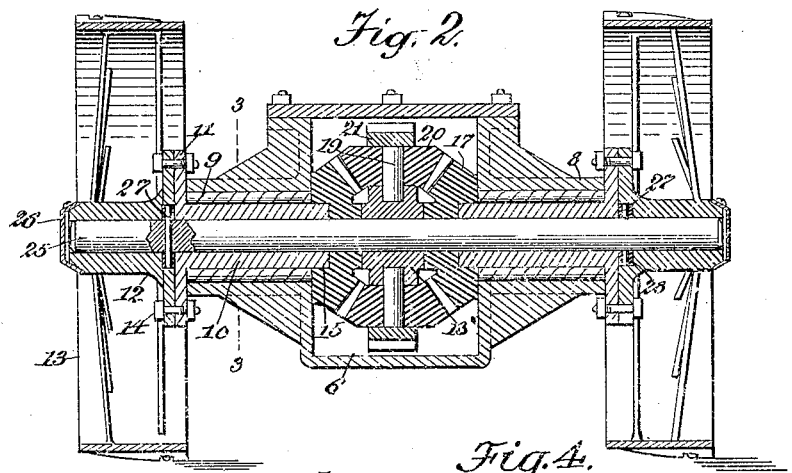
Figures 3, 4:
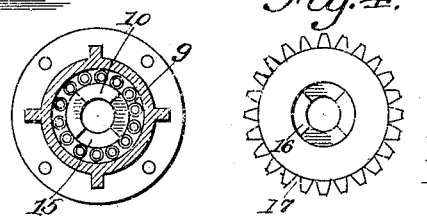

Figure 1 is a plan view of the rear or driving portion of a tractor, with the cover of the differential case removed. Fig. 2 is a central, vertical section of the same. Fig. 3 is a section of one of the rear bearings in the line 3—3, the tubular journal being in elevation, and as seen from the right side of the section line. Fig. 4 shows the face of the gear that drives the journal on the side engaging the same.

In the drawing, the numeral 5 denotes the main frame of a tractor, the rear portion of which only is shown. This is provided with an oil-well 6 housing the gearing of the differential to be mentioned more in detail presently. Power from the engine (not shown) is transmitted to the differential gearing through a drive-shaft 7, as herein illustrated, the specific nature of the drive and differential not forming a part of this invention. Extending laterally from the main frame are the main bearings 8, each a single, cylindrical structure, the construction being such that the bearings may both be bored to true alinement in a single operation. The bearings are preferably equipped with antifriction rollers 9, those of the well-known "Hyatt" type being illustrated. Inside these rollers are mounted the tubular journals 10, which are flanged at 11 and thus adapted to connect with the correspondingly flanged hubs 12 of the traction wheels 13 by suitable bolts 14. The opposite ends of the journals are formed with clutch jaws 15, which engage similar jaws 16 formed in the driving bevel-gears 17 of the differential.

The differential herein shown is of a familiar type, in so far as it connects with the axle, having the usual driving bevel-gears 17, and interposed spider 18 provided with studs 19 and pinions 20, and a ring-gear 21 attached to the spider. As herein shown the ring-gear meshes with a pinion 22 on a jack-shaft 23, which is driven from the shaft 7 through bevel-gears 24.

Referring to Fig. 2 it will be seen that the hubs of the tractor wheels, the attached journals, the engaging bevel gears and the hub of the central spider are all bored to receive a straight shaft 25. This fits neatly, but removably in place, and might be held therein by only the hub-caps 26. But the purpose of this shaft is not only to serve as a support for the spider and driving-gears of the differential, and as a stiffener for the tubular journals, but to tie the parts together and strongly reinforce the main frame. The shaft is therefore provided with collars 28 pinned at 27 and fitting into corresponding recesses in the hubs of the tractor-wheels. When these hubs are detached the pins may be inserted or driven out, and when in attached position they hold the pins in place. The construction is adapted to prevent any spreading or splitting of the main frame through the oil-well under excessive strains, either of which has hitherto been possible, the main frame being a steel casting, and the effect of which is of course to open the meshing of the differential gears and loosen the engagement of the tubular bearings therewith.

It will be evident that the whole structure may be very readily assembled and disassembled. With the tractor suitably jacked up, a wheel may be unbolted, the pin 27 removed, and the tubular bearing slipped out endwise. By removing the other wheel, unpinning the shaft at that end, and taking off the oil-well cover, the whole rear axle assembly may be taken apart, the differential being lifted out of the well after slipping out the shaft 25.

The construction is also adapted to secure the highest efficiency where it is most needed. With a drive of this type, centrally applied, instead of through gearing internal to the traction wheels, the combined weight of the frame and its connections, the strains on the traction wheels, and the downward pressure exerted on the driving gear all tend to force downwardly the inner ends of the tubular bearings. If the bearing is divided these strains tend to loosen or break the bearing bolts, and in the case of babbited bearings to rapidly wear away the inner ends of the lower halves, bending the shaft and distorting the positions of the traction wheels. These disadvantages are very largely overcome by the improved construction above described, since nothing but actual wear can impair the alinement of the axle parts. Forming the bearings integral and indivisible tends also to greatly strengthen the frame, since the bearings may be braced in every direction, as indicated.

Having thus described my invention, I claim:

1. In a tractor, the combination of a main frame, having laterally disposed, one-piece bearings in alinement, intermediate driving mechanism, tubular journals having clutch-jawed ends of no greater diameter than the bodies of the journals, traction wheels with hubs adjacent the outer ends of said journals, and a central shaft passing through the wheel-hubs, journals and driving mechanism, the members adjacent the clutch end of the journals being clutch-jawed to engage therewith.

2. In a tractor, the combination of a main frame having laterally disposed, alined bearings and an intermediate oil-well, differential driving gearing mounted therein concentric with the bearings, adjacent tubular journals with clutch-faced ends engaging said gearing, a central shaft passing through the journals and gearing, thrust collars secured to the shaft, by pinning, and traction wheels secured to the outer ends of the journals.

3. In a tractor, the combination of a main frame having laterally disposed bearings in alinement and an intermediate oil-well, clutch-faced driving gears mounted in said well concentric with the bearings, clutch-jawed tubular journals engaging said gears, a central shaft passing through the journals and gears, thrust collars secured to the shaft, by pinning, and traction wheels attached to the outer ends of the journals.

4. In a tractor, the herein described driving axle mounting, comprising a main frame with alined bearings and an intermediate oil-well, clutch-faced driving gears therein, clutch-jawed tubular journals separably engaging therewith, traction-wheels with hubs adjacent to the outer ends of said journals and suitably connected with said outer ends, a central shaft passing through the wheel hubs, journals and gears, and thrust-collars pinned to the shaft and projecting into recesses in the wheel-hubs.

In testimony whereof I affix my signature in presence of two witnesses.

CHARLES L. MILLER.

Witnesses:
    E. W. WINTER,
    CHAS. A. WINTER.